US012794301B2

(12) United States Patent
Puma Benavides et al.

(10) Patent No.: US 12,794,301 B2
(45) Date of Patent: Nov. 10, 2026

(54) BUSBAR FIXATION BY HAIRPINS AND BRACKETS

(71) Applicant: Schaeffler Technologies AG & Co. KG, Herzogenaurach (DE)

(72) Inventors: David Sebastian Puma Benavides, Puebla (MX); Jose Enrique Lozada Brito, Libres (MX); Ramon Castillo Diaz, Guadalajara (MX)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 171 days.

(21) Appl. No.: 18/429,041

(22) Filed: Jan. 31, 2024

(65) Prior Publication Data

US 2025/0246963 A1 Jul. 31, 2025

(51) Int. Cl.
*H02K 3/50* (2006.01)

(52) U.S. Cl.
CPC ........... *H02K 3/50* (2013.01); *H02K 2203/09* (2013.01)

(58) Field of Classification Search
CPC ........................................................ H02K 3/50
See application file for complete search history.

(56) References Cited

U.S. PATENT DOCUMENTS

| | | | | |
|---|---|---|---|---|
| 4,490,636 A * | 12/1984 | McBratney | H02K 3/50 | 310/260 |
| 7,128,621 B2 * | 10/2006 | Onose | H01R 43/0228 | 219/91.21 |
| 8,436,506 B2 * | 5/2013 | Wang | H02K 15/35 | 228/115 |
| 9,847,683 B2 * | 12/2017 | Jung | H02K 3/28 | |
| 10,181,658 B2 * | 1/2019 | Neet | H02K 11/05 | |
| 10,213,878 B2 * | 2/2019 | Schroth | B23K 9/167 | |
| 10,892,671 B2 * | 1/2021 | Wang | B23K 26/282 | |
| 11,283,323 B2 * | 3/2022 | Dunn | H02K 15/021 | |
| 11,437,878 B2 * | 9/2022 | Burmeister | H01R 25/162 | |
| 2011/0248585 A1 * | 10/2011 | Wang | H02K 15/35 | 310/71 |
| 2014/0077636 A1 * | 3/2014 | Jung | H02K 11/0094 | 310/71 |
| 2016/0218603 A1 * | 7/2016 | Schroth | B23K 9/167 | |
| 2020/0067362 A1 * | 2/2020 | Shiah | H02K 3/28 | |
| 2024/0030772 A1 * | 1/2024 | Dieterich | H02K 3/50 | |

FOREIGN PATENT DOCUMENTS

| | | |
|---|---|---|
| KR | 20130127058 A | 11/2013 |
| KR | 20180028767 A | 3/2018 |

* cited by examiner

*Primary Examiner* — Alexander Talpalatski
(74) *Attorney, Agent, or Firm* — Suiter Swantz IP

(57) ABSTRACT

Voltage terminals of hairpin windings and bus pins of busbars may be fixed using one or more caps. Variants of the caps include press fit and welded caps. The variants may include caps for the connections between the voltage terminals and bus pins. The variants may also include one of the caps for the connections between the voltage terminals and the bus pins at a common phase along the inner-radius and one of the caps for the connections between the voltage terminals and the bus pins at a common phase along the outer-radius. A clamp may include an overmold and caps.

18 Claims, 18 Drawing Sheets

100

106

100

100

128

100

128

128

100

BUSBAR FIXATION BY HAIRPINS AND BRACKETS

TECHNICAL FIELD

The present disclosure generally relates to electrical connections between conductive members, and, more particularly, to electrical connections between busbars and hairpin windings.

BACKGROUND

Current distribution to electric motors may be achieved through a junction box. Internally, the junction box connects and distributes the necessary current for a winding through a busbar. The busbar distributes the current at the winding stator to generate the magnetic field and produce rotor movement. The busbar may not require direct mechanical fixation to a stator core. Instead, the busbar may be fixed through contact with the windings. For this reason, the vibration affects the busbar and can lead to busbar detachment. Therefore, it would be advantageous to provide a device, system, and method that cures the shortcomings described above.

SUMMARY

An electric motor is described, in accordance with one or more embodiments of the present disclosure. The electric motor may include a rotor. The electric motor may include a stator including a stator core and a winding. The winding may include a plurality of hairpins. The plurality of hairpins may include a plurality of voltage terminals and a plurality of neutral terminals. The electric motor may include a busbar including a plurality of bus pins and a neutral bus. The plurality of neutral terminals may be connected to the neutral bus. The electric motor may include a plurality of caps, wherein the plurality of caps include a cuboid shape. The plurality of caps may each define one or more slots. The plurality of voltage terminals and the plurality of bus pins may be disposed in the one or more slots to join the plurality of voltage terminals with the plurality of bus pins.

An inner-radius clamp for an electric motor is described, in accordance with one or more embodiments of the present disclosure. The inner-radius clamp may include a plurality of caps. The plurality of caps include a cuboid shape. The plurality of caps may define one or more slots. A plurality of voltage terminals and a plurality of bus pins are configured to be disposed in the one or more slots to join the plurality of voltage terminals with the plurality of bus pins. The plurality of caps may include one or more first-phase caps, one or more second-phase caps, and one or more third-phase caps. The inner-radius clamp may include an overmold including an arcuate portion and a plurality of projection portions. The plurality of projection portions may extend radially outward from the arcuate portion. The plurality of projection portions may be connected to the one or more first-phase caps, the one or more second-phase caps, and the one or more third-phase caps.

An outer-radius clamp for an electric motor is described, in accordance with one or more embodiments of the present disclosure. The outer-radius clamp may include a plurality of caps. The plurality of caps may include a cuboid shape. The plurality of caps may define one or more slots. A plurality of voltage terminals and a plurality of bus pins are configured to be disposed in the one or more slots to join the plurality of voltage terminals with the plurality of bus pins.

The plurality of caps may include one or more first-phase caps, one or more second-phase caps, and one or more third-phase caps. The outer-radius clamp may include an overmold including an arcuate portion and a plurality of projection portions. The plurality of projection portions may extend radially inward from the arcuate portion. The plurality of projection portions may be connected to the one or more first-phase caps, the one or more second-phase caps, and the one or more third-phase caps.

BRIEF DESCRIPTION OF THE DRAWINGS

The numerous advantages of the disclosure may be better understood by those skilled in the art by reference to the accompanying figures in which:

FIG. 1I depicts a perspective view of a cap which has a slot, in accordance with one or more embodiments of the present disclosure.

DETAILED DESCRIPTION

Figure 1A:
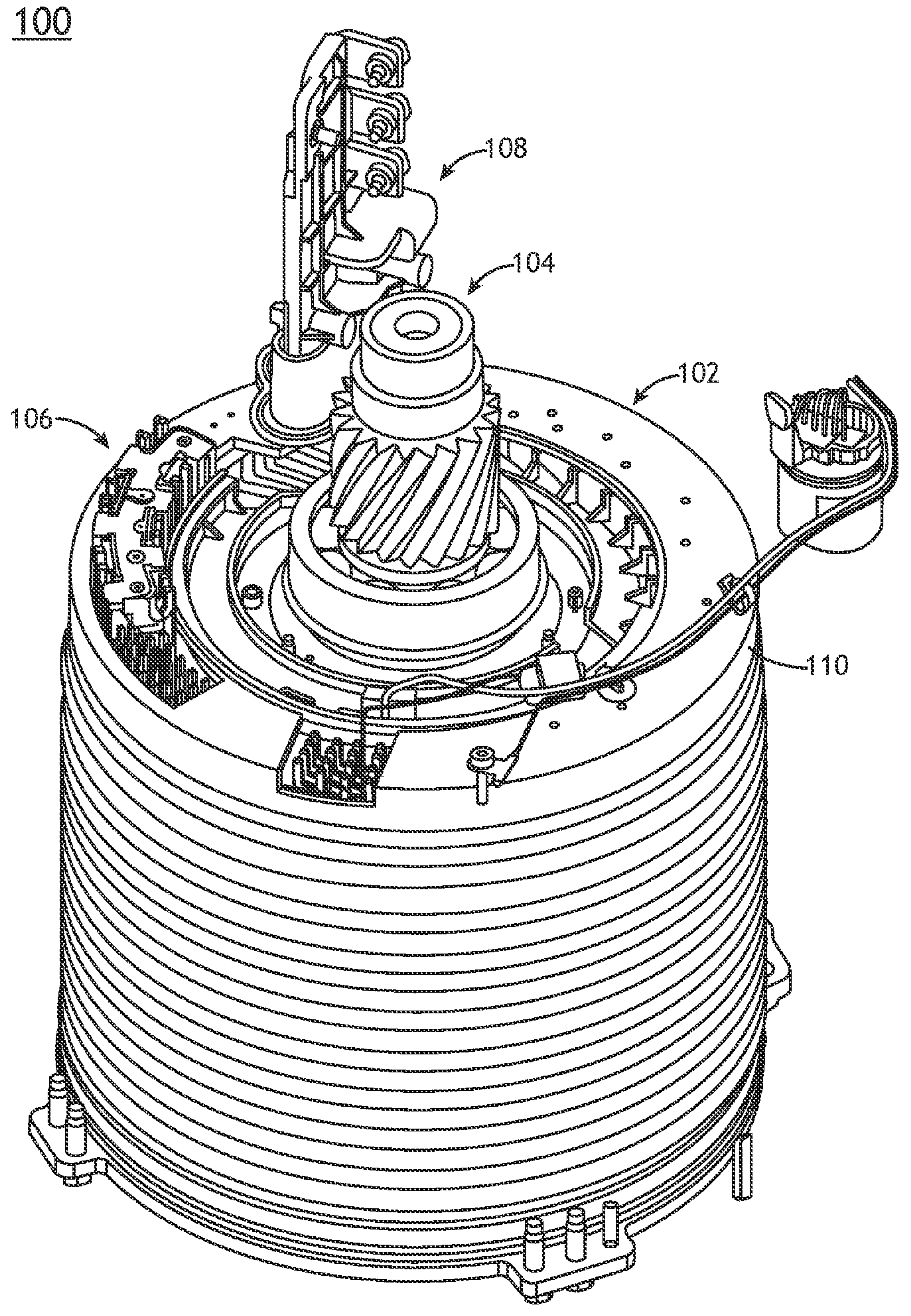
FIG. 1A depicts a perspective view of an electric motor, in accordance with one or more embodiments of the present disclosure.
Figure 1B:
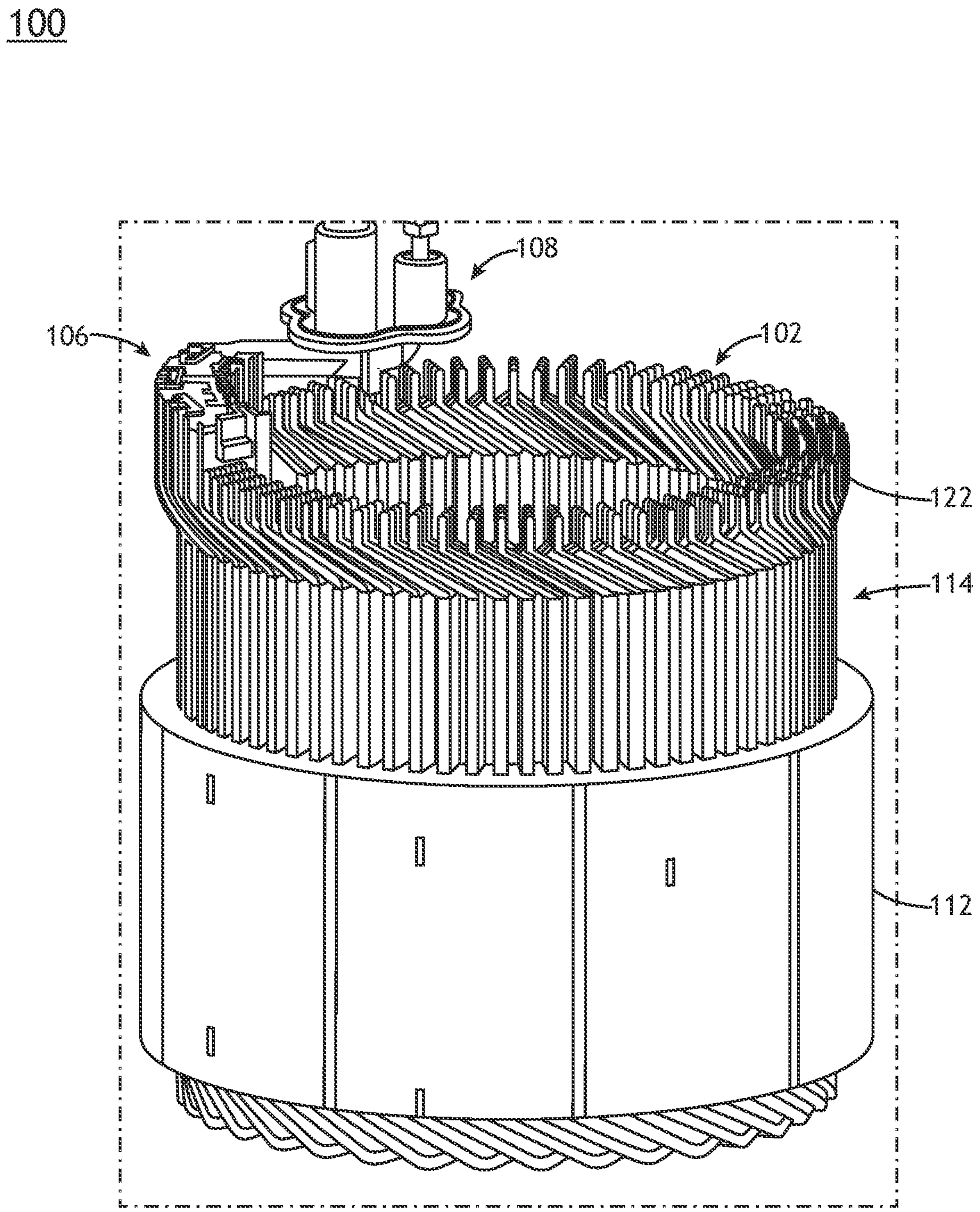
FIG. 1B depicts a perspective view of an electric motor with a stator carrier which is hidden, in accordance with one or more embodiments of the present disclosure.
Figure 1C:
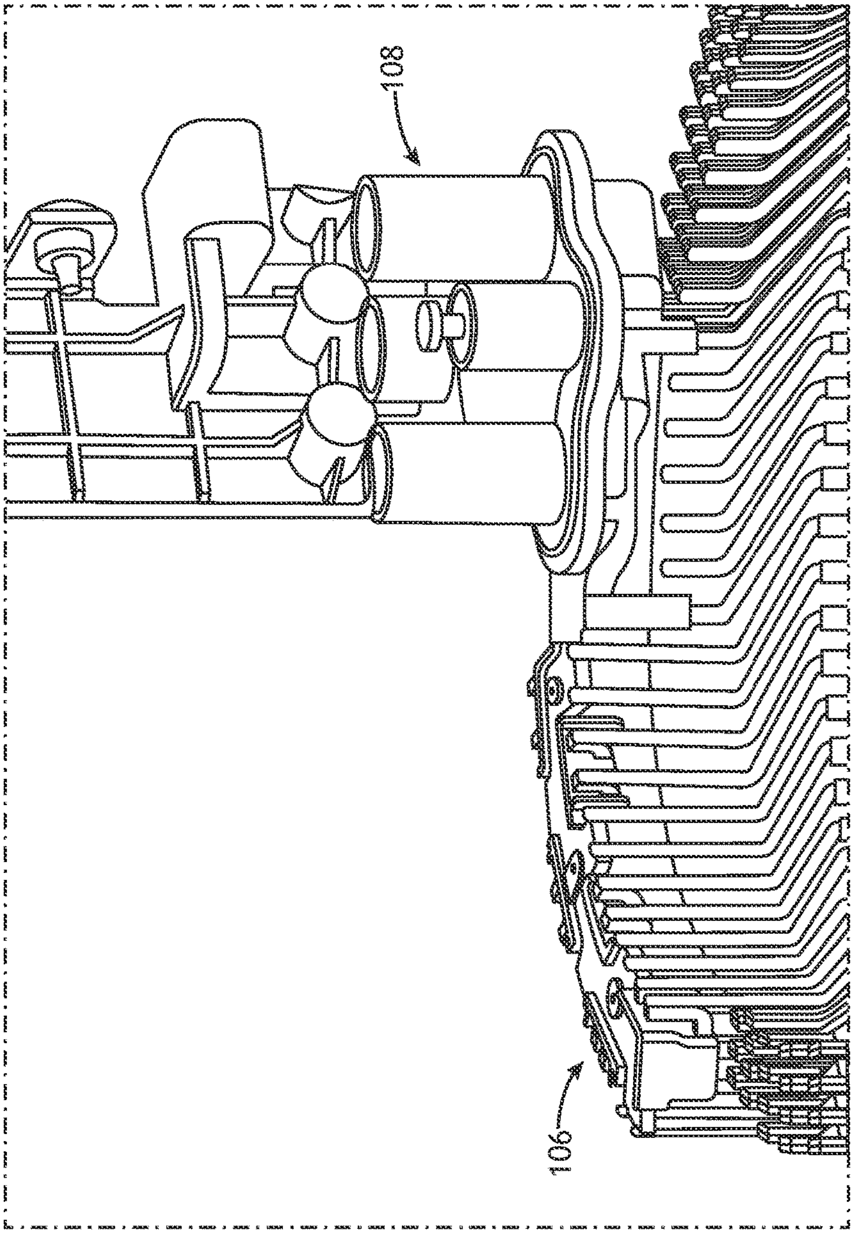
FIG. 1C depicts a partial perspective view of windings, a busbar, and a junction box of an electric motor, in accordance with one or more embodiments of the present disclosure.
Figure 1D:
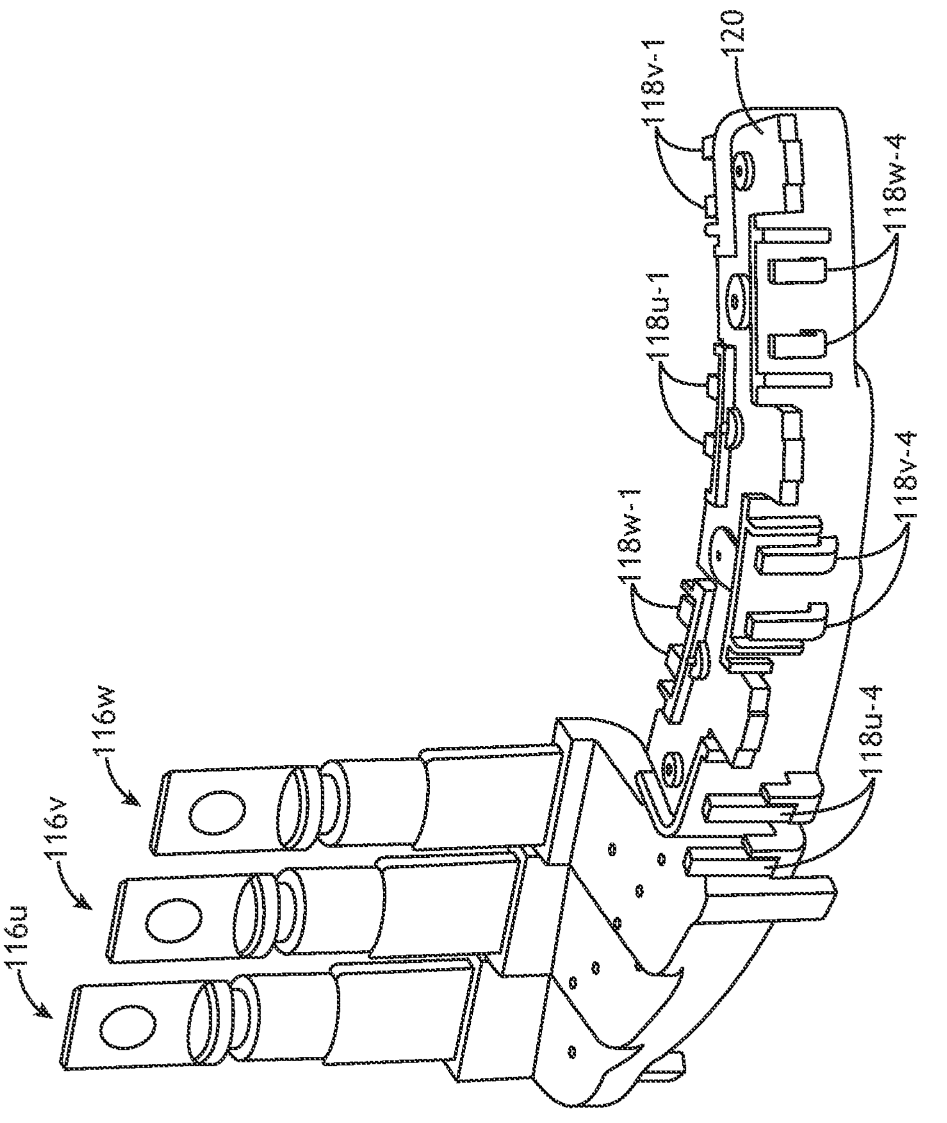
FIG. 1D depicts a perspective view of a busbar of an electric motor, in accordance with one or more embodiments of the present disclosure.
Figure 1E:
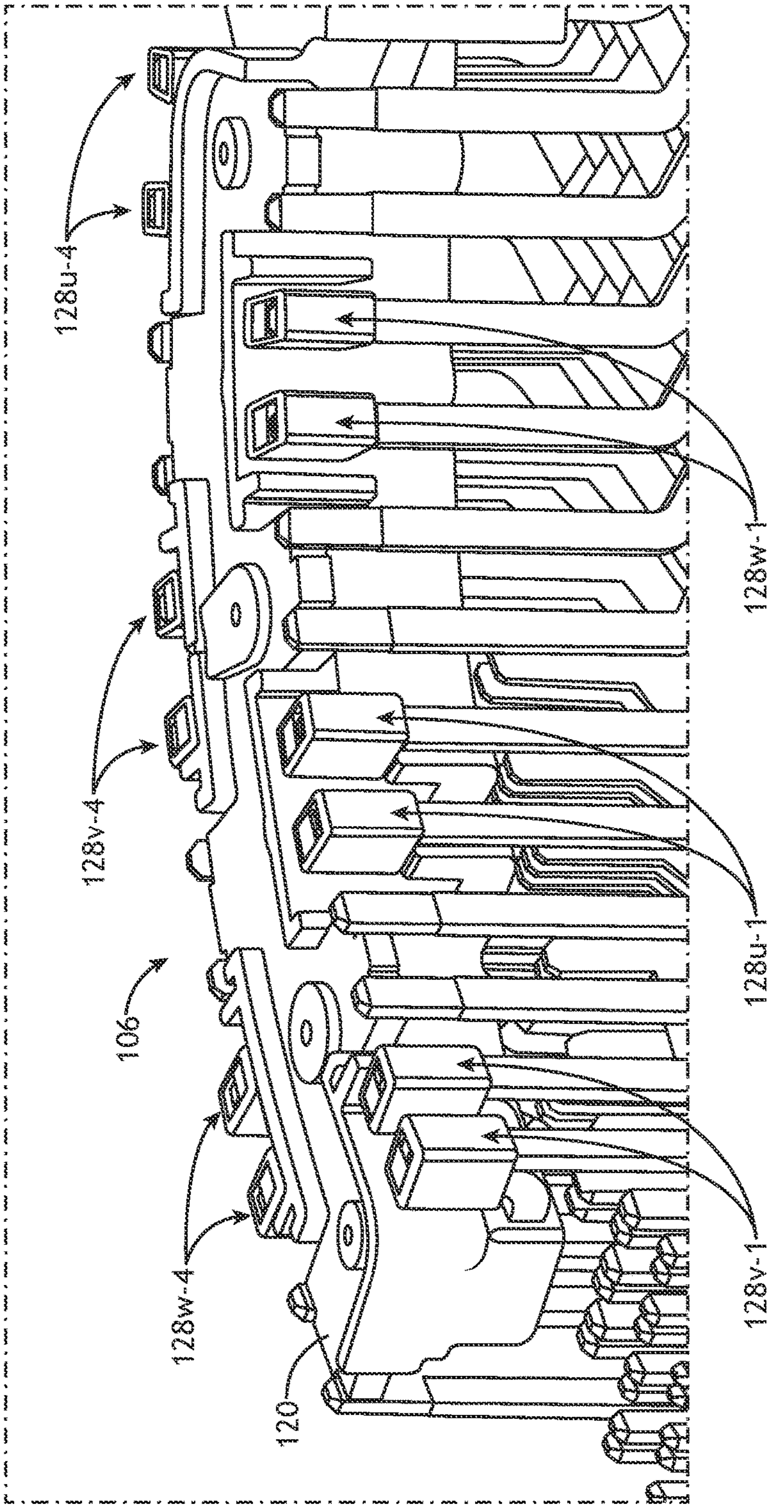
FIG. 1E depicts connections between a busbar, windings, and caps of an electric motor, in accordance with one or more embodiments of the present disclosure.
Figure 1F:
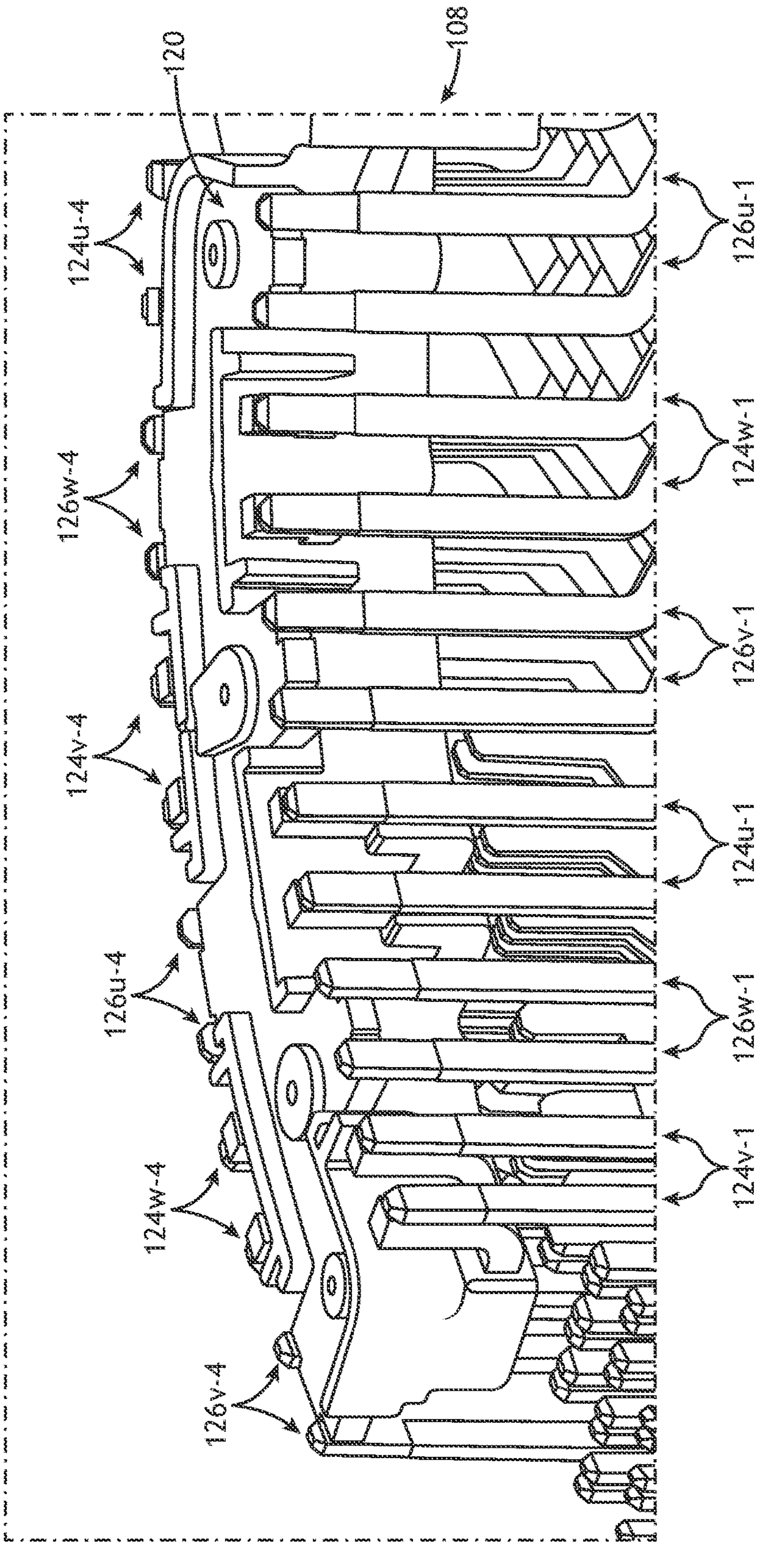
FIG. 1F depicts connections between a busbar and windings with caps which are hidden, in accordance with one or more embodiments of the present disclosure.
Figure 1G:
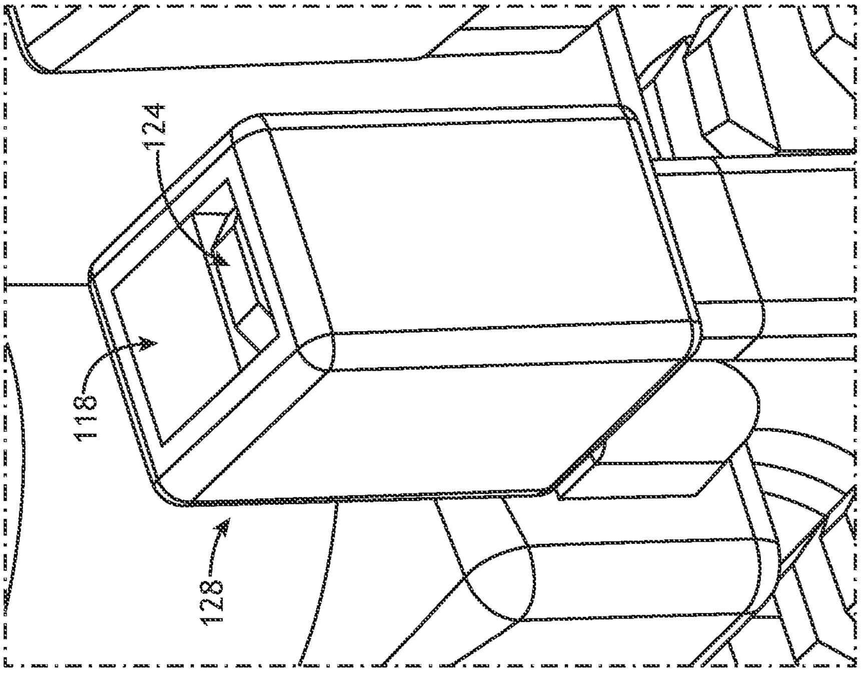
FIG. 1G depicts a perspective view of a connection between a busbar, a winding, and a cap of an electric motor, in accordance with one or more embodiments of the present disclosure.
Figure 1H:
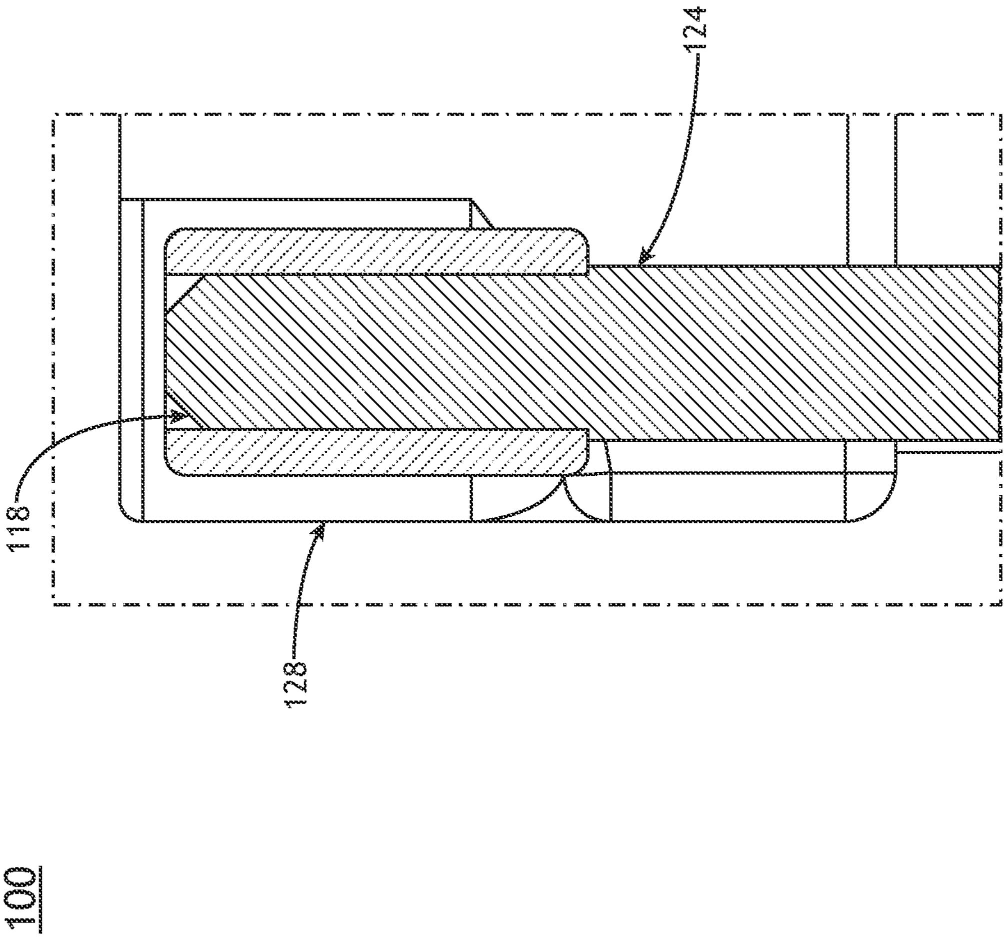
FIG. 1H depicts a cross-section view of a connection between a busbar, a winding, and a cap of an electric motor, in accordance with one or more embodiments of the present disclosure.
Figure 11:
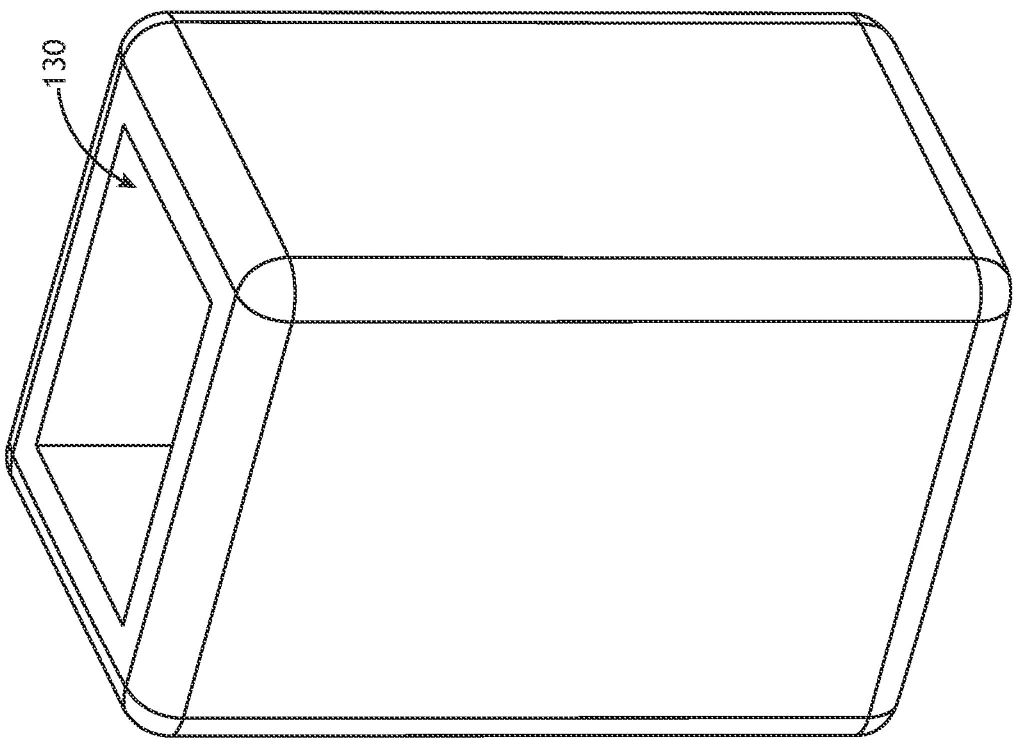

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to busbar fixation by hairpins and brackets. Voltage terminals of hairpin windings and bus pins of busbars may be fixed using one or more caps. Variants of the caps include press fit and welded caps. The variants may include caps for each of the connections between the voltage terminals and bus pins. The variants may also include one of the caps for each of the connections between the voltage terminals and the bus pins at a common phase along the inner-radius and one of the caps for each of the connections between the voltage terminals and the bus pins at a common phase along the outer-radius. Inner radius and outer radius clamps may include an overmold and the caps.

FIGS. 1A-1I illustrate an electric motor 100, in accordance with one or more embodiments of the present disclosure. The electric motor 100 may be a three-phase electric motor. The electric motor 100 may include a stator 102, a rotor 104, a busbar 106, a junction box 108, one or more caps 128, and the like.

The junction box 108 may receive current from one or more external components. For example, the junction box 108 may receive current from an inverter, controller, or the like. The junction box 108 may receive one or more phases of current. In embodiments, the junction box 108 may receive three phases of current, including first-phase (u), second-phase (v), and third-phase (w). The first-phase (u), the second-phase (v), and the third-phase (w) are generally aligned 120-degrees out of phase.

The junction box 108 may be connected to the busbar 106. The busbar 106 may receive the current from the junction box 108. For example, the busbar 106 may receive the three phases of current from the junction box 108. The busbar 106 may include one or more components, such as, but not limited to, bars 116, bus pins 118, neutral bus 120, and the like.

The bars 116 may be rigid elements for engagement with the junction box 108. Each of the bars 116 may be associated with a respective phase of electricity. The busbar 106 may include any number of the bars 116. In embodiments, the bars 116 may include a first-phase bar 116*u*, a second-phase bar 116*v*, and a third-phase bar 116*w*. The first-phase bar 116*u* may be associated the first-phase (u) of electricity, the second-phase bar 116*v* may be associated with the second-phase (v) of electricity, and the third-phase bar 116*w* may be associated with the third-phase (w) of electricity, respectively.

The bus pins 118 may be connected to the bars 116 such that each of the bus pins 118 is associated with a respective phase of electricity. For example, the bus pins 118 may include one or more first-phase bus pins 118*u*, one or more second-phase bus pins 118*v*, and one or more third-phase bus pins 118*w*. The first-phase bus pins 118*u* may be connected to the first-phase bar 116*u*, the second-phase bus pins 118*v* may be connected to the second-phase bar 116*v*, and the third-phase bus pins 118*w* may be connected to the third-phase bar 116*w*, respectively. The bus pins 118 may be connected to the bars 116 via one or more internal traces within the busbar 106.

The bus pins 118 may be rigid elements for engagement with the stator 102. The busbar 106 may distribute the three phases of current to the stator 102. For example, the bus pins 118 may be connected to the stator 102 for distributing the three phases of current. The stator 102 may receive the current from the busbar 106. The stator 102 may induce a magnetic field in response to receiving the three phases of current from the busbar 106.

The rotor 104 may be disposed within a central axis of the stator 102. The rotor 104 may be supported by the stator 102 via one nor more bearings. The magnetic field induced by the stator 102 may cause the rotor 104 to rotate relative to the stator 102. The rotor 104 may perform work on one or more external components via the rotation of the rotor 104. Thus, the electric motor 100 may be a dynamo-electric machine which converts electrical energy to mechanical energy by electromagnetic means.

The stator 102 may include one or more of a stator carrier 110, a stator core 112, a winding 114, and the like. The stator carrier 110 may be a housing for the components of the stator 102. The stator carrier 110 may encapsulate the stator core 112, the winding 114, and the like. The stator core 112 may be made of stacks of one or more stacks of lamination. The stator core 112 may define one or more slots for the winding 114. The winding 114 of the stator 102 may disposed in the slots of the stator core.

The winding 114 may receive the current from the busbar 106 and induce the magnetic field. The winding 114 may include any suitable type of winding, such as, but not limited to, a hairpin winding (e.g., a hairpin lap winding) or the like. The winding 114 may be made of a plurality of hairpins 122. The hairpins 122 may be joined together to form the winding 114. For example, the hairpins 122 may be joined together by a weld (e.g., a laser weld), cap, or the like to form the winding 114. The hairpins 122 may be flat bars which may be bent into a select shape. For example, the hairpins 122 may include a "U-shape" or the like.

The winding 114 may be a three-phase winding including the first-phase (u), the second-phase (v), and the third-phase (w). The winding 114 may include poles which alternate in sequence between the first-phase (u), the second-phase (v), and the third-phase (w). The hairpins 122 may carry a respective of the phases to define the poles. For example, the hairpins 122 may include first-phase hairpins 122*u*, second-phase hairpins 122*v*, and third-phase hairpins 122*w*. The first-phase hairpins 122*u*, second-phase hairpins 122*v*, and third-phase hairpins 122*w* may similarly be arranged in the alternating arrangement.

The first-phase hairpins 122*u*, second-phase hairpins 122*v*, and third-phase hairpins 122*w* may be connected to the first-phase bus pins 118*u*, the second-phase bus pins 118*v*, and the third-phase bus pins 118*w*, respectively. The hairpins 122 may include one or more voltage terminals 124. For example, the first-phase hairpins 122*u* may include one or more first-phase voltage terminals 124*u*, the second-phase hairpins 122*v* may include one or more second-phase voltage terminals 124*v*, and the third-phase hairpins 122*w* may include one or more third-phase voltage terminals 124*w*. The first-phase voltage terminals 124*u*, the second-phase voltage terminals 124*v*, and the third-phase voltage terminals 124*w* may be connected to the first-phase bus pins 118*u*, the second-phase bus pins 118*v*, and the third-phase bus pins 118*w*, respectively. Thus, the voltage terminals 124 may connect the hairpins 122 of the winding 114 to the bus pins 118 of the busbar 106. The connection between the voltage terminals 124 and the bus pins 118 may be referred to as a pin/pin connection.

The winding 114 may be coupled to the neutral bus 120. The first-phase hairpins 122*u*, second-phase hairpins 122*v*, and third-phase hairpins 122*w* of the winding 114 may be connected to the neutral bus 120. The hairpins 122 may include one or more neutral terminals 126. For example, the first-phase hairpins 122*u* may include one or more first-phase neutral terminals 126*u*, the second-phase hairpins 122*v* may include one or more second-phase neutral terminals 126*v*, and the third-phase hairpins 122*w* may include one or more third-phase neutral terminals 126*w*. The first-phase neutral terminals 126*u*, the second-phase neutral terminals 126*v*, and the third-phase neutral terminals 126*w* may each be connected to the neutral bus 120. Thus, the neutral terminals 126 may couple the hairpins 122 of the winding 114 to the neutral bus 120 of the busbar 106. The connection between the neutral terminals 126 and the neutral bus 120 may be referred to as a pin/neutral connection.

The busbar 106 may be connected to the winding 114 by both the voltage terminals and the neutral terminals 126. The winding 114 may support the busbar 106 by the connection. The voltage terminals 124 and the neutral terminals 126 may extend through the stator carrier 110 up to the busbar 106 to establish the connection. The busbar 106 may or may not be directly connected to the stator carrier 110 and/or the stator core 112.

The busbar 106 may distribute current for the winding 114. For example, the busbar 106 may distribute each of the phases of current to the winding 114. The busbar 106 may distribute the three phases to the winding 114 by the voltage terminals 124 and the neutral terminals 126. The voltage terminals 124 and the neutral terminals 126 may be disposed at opposing ends of the winding 114. The winding 114 may be a "wye" transformer by being connected at a first end to the first-phase bus pins 118*u*, the second-phase bus pins 118*v*, and the third-phase bus pins 118*w*, respectively, and by being connected at a second end to the neutral bus 120. The neutral bus 120 is a common neutral between each of the phases. The neutral bus 120 may or may not be connected to ground.

In embodiments, the voltage terminals 124 may be connected to the bus pins 118 and/or the neutral terminals 126 may be connected to the neutral bus 120 by one or more welds. The welds between the voltage terminals 124 and the bus pins 118 may be subject to stress due to vibrations of the stator 102. For example, the stator 102 may vibrate due to rotation of the rotor 104. A high bending moment in the welds may occur due to resonance. One challenge with connecting the voltage terminals 124 to the bus pins 118 by the welds is that the stress induced by the vibrations of the stator 102 may cause the welds between the voltage terminals 124 and the bus pins 118 to fail.

In embodiments, the electric motor 100 may include one or more caps 128. The one or more caps 128 may be brackets or the like. The caps 128 may join the busbar 106 with the winding 114. In particular, the caps 128 may join the voltage terminals 124 of the hairpins 122 with the bus pins 118. In embodiments, the electric motor 100 may include the caps 128 for each of the connections between the voltage terminals 124 and the bus pins 118.

The caps 128 may alleviate stress that is produced in the welds between the voltage terminals 124 and the bus pins 118 when subject to vibration. The caps 128 may provide strength to the welds and reduces the shear stress due to the bending moment. The caps 128 may reduce the shear stress by distributing the load around the cap. For example, normal moments produced by the caps 128 may oppose a bending moment according to the movement produced by the vibration. The caps 128 may thus provide resistance against the vibration, thereby avoiding cracks in the welds.

The caps 128 may include a cuboid shape. The cuboid shape may include a six-faced solid. The caps 128 may define one or more slots 130. The slots 130 may be defined in one or more faces of the cuboid shape. The voltage terminals 124 and the bus pins 118 may be disposed in the slots 130 defined by the caps 128. Being disposed in the slots 130 defined by the caps 128 may join the voltage terminals 124 and the bus pins 118. In embodiments, the slots 130 may include a select shape, such as, but not limited to, rectangular slots. In embodiments, the slots 130 may be through holes (e.g., rectangular through holes) between opposing faces of the cuboid shape, such that the caps 128 may include hollow cuboid shape.

In embodiments, the voltage terminals 124 and the bus pins 118 may be press fit into the slots 130 defined by the caps 128. The voltage terminals 124 may be press fit into the slots 130 with the bus pins 118. For example, the first-phase voltage terminals 124*u* may be press fit into the slots 130 with the first-phase bus pins 118*u*, the second-phase voltage terminals 124*v* may be press fit into the slots 130 with the second-phase bus pins 118*v*, and the third-phase voltage terminals 124*w* may be press fit into the slots 130 with the third-phase bus pins 118*w*. The press fit may be an interference fit, a friction fit, or the like. The voltage terminals 124 may be pressed against the bus pins 118 by the caps 128. As a result, the caps 128 may join the voltage terminals 124 and the bus pins 118 without welding. The caps 128 may be prevented from separating from the voltage terminals 124 and the bus pins 118 by the press fit.

The caps 128 may join the first-phase voltage terminals 124*u* with the first-phase bus pins 118*u*, join the second-phase voltage terminals 124*v* with the second-phase bus pins 118*v*, and join the third-phase voltage terminals 124*w* with the third-phase bus pins 118*w*. The caps 128 may be associated with each of the respective phases. For example, the caps 128 may include first-phase caps 128*u*, second-phase caps 128*v*, and third-phase caps 128*w*. The first-phase caps 128*u* may join the first-phase voltage terminals 124*u* with the first-phase bus pins 118*u*. The second-phase caps 128*v* may join the second-phase voltage terminals 124*v* with the second-phase bus pins 118*v*. The third-phase caps 128*w* may join the third-phase voltage terminals 124*w* with the third-phase bus pins 118*w*.

The winding 114 may define one or more poles. The poles defined by the winding 114 may be arranged in sectors around the rotor 104. For example, the winding 114 may define twelve-poles which may be arranged in thirty-degree sectors around the rotor 104, although this is not intended to be limiting. The winding 114 may also include greater than or less than the twelve-poles.

The winding 114 may include one or more hairpins-per-pole-group. The hairpins-per-pole-group may be the number of the hairpins 122 at a select phase which are grouped to define each of the poles. The electric motor 100 may include a matching number of the caps 128 for the hairpins-per-pole-group. For example, the winding 114 may include two of the hairpins-per-pole-group at a respective phase, although this is not intended as a limitation of the present disclosure. For instance, the winding 114 may include two of the first-phase hairpins 122*u*, two of the second-phase hairpins 122*v*, and two of the third-phase hairpins 122*w* per-pole-group. It is further contemplated that the winding 114 may include one, two, three, or more of the hairpins-per-pole-group. The number of the voltage terminals 124, the neutral terminals 126, and the caps 128 may be based on the number of hairpins-per-pole-group. For example, the two of the first-phase hairpins 122*u*, two of the second-phase hairpins 122*v*, and two of the third-phase hairpins 122*w* may each include two of voltage terminals 124 and two of neutral terminals 126. The electric motor 100 may also include two of the caps 128 for each of the two of voltage terminals 124 and the two of bus pins 118. Thus, the two of the caps 128 may join the two of the voltage terminals 124 with the two of the bus pins 118.

The winding 114 may also include a select number of layers. For example, the winding 114 may include a two-layer winding, a four-layer winding, and the like. In embodiments, the winding 114 is the four-layer winding. The four-layer winding may include a first-layer disposed closest to the inner-radius of the stator core 112, a fourth-layer disposed closest to the outer-radius of the stator core 112, a second-layer disposed adjacent to the first-layer, and a third-layer disposed between the second-layer and the fourth-layer. The winding 114 may include a first set of the hairpins 122 which may span between the first and second of the layers. The winding 114 may also include a second set of the hairpins 122 which may span between the third and fourth of the layers. The first set of hairpins 122 and the second set of hairpins 122 may each include the first-phase hairpins 122*u*, the second-phase hairpins 122*v*, and the third-phase hairpins 122*w*. The pole-groups of the first set of hairpins 122 may be aligned with the pole-groups of the first set of hairpins 122. For example, the first-phase hairpins 122*u* may be aligned, the second-phase hairpins 122*v* may be aligned, and the third-phase hairpins 122*w* may be aligned across the layers to cooperatively define the poles. In embodiments, the hairpins 122 may include varying sizes. The varying sizes may be based on the layers to which the hairpins 122 may be disposed. The first set of the hairpins 122 may be smaller than the second set of the hairpins 122 to maintain the alignment of the first-phase hairpins 122*u*, the second-phase hairpins 122*v*, and the third-phase hairpins 122*w*, respectively.

The voltage terminals 124 may be disposed in one or more layers of the winding 114. In embodiments, the voltage terminals 124 may be disposed in the first-layer and/or the fourth-layer of the winding 114, where the winding 114 is a four-layer winding. For example, the first-phase voltage terminals 124*u* may include first-layer, first-phase voltage terminals 124*u*-1 disposed in the first-layer and/or may include fourth-layer, first-phase voltage terminals 124*u*-4 disposed in the fourth-layer. By way of another example, the second-phase voltage terminals 124*v* may include first-layer, second-phase voltage terminals 124*v*-1 disposed in the first-layer and/or may include fourth-layer, second-phase voltage terminals 124*v*-4 disposed in the fourth-layer. By way of another example, the third-phase voltage terminals 124*w* may include first-layer, third-phase voltage terminals 124*w*-1 disposed in the first-layer and/or may include fourth-layer, third-phase voltage terminals 124*w*-4 disposed in the fourth-layer.

The first-phase bus pins 118*u*, the second-phase bus pins 118*v*, and the third-phase bus pins 118*w* may be disposed along an inner-radius and/or along an outer-radius of the busbar 106. For example, the first-phase bus pins 118*u* may include inner-radius, first-phase bus pins 118*u*-1 disposed along the inner-radius and/or may include outer-radius, first-phase bus pins 118*u*-4 disposed along the outer-radius. By way of another example, the second-phase bus pins 118*v* may include inner-radius, second-phase bus pins 118*v*-1 disposed along the inner-radius and/or may include outer-radius, second-phase bus pins 118*v*-4 disposed along the outer-radius. By way of another example, the third-phase bus pins 118*w* may include inner-radius, third-phase bus pins 118*w*-1 disposed along the inner-radius and/or may include outer-radius, third-phase bus pins 118*w*-4 disposed along the outer-radius.

The first-phase bus pins 118*u*, the second-phase bus pins 118*v*, and the third-phase bus pins 118*w* disposed along the inner-radius and the outer-radius may connect to the voltage terminals 124 disposed in the first-layer and the fourth-layer, respectively. For example, the first-layer, first-phase voltage terminals 124*u*-1 and the fourth-layer, first-phase voltage terminals 124*u*-4 may be connected to the inner-radius, first-phase bus pins 118*u*-1 and the outer-radius, first-phase bus pins 118*u*-4, respectively. By way of another example, the first-layer, second-phase voltage terminals 124*v*-1 and the fourth-layer, second-phase voltage terminals 124*v*-4 may be connected to the inner-radius, second-phase bus pins 118*v*-1 and the outer-radius, second-phase bus pins 118*v*-4, respectively. By way of another example, the first-layer, third-phase voltage terminals 124*w*-1 and the fourth-layer, third-phase voltage terminals 124*w*-4 may be connected to the inner-radius, third-phase bus pins 118*w*-1 and the outer-radius, third-phase bus pins 118*w*-4, respectively.

The electric motor 100 may also include the caps 128 to join the bus pins 118 disposed along the inner-radius and the outer-radius with the voltage terminals 124 disposed in the first-layer and the fourth-layer, respectively. For example, first-layer, first-phase caps 128*u*-1 and fourth-layer, first-phase caps 128*u*-4 may join the first-layer, first-phase voltage terminals 124*u*-1 and the fourth-layer, first-phase voltage terminals 124*u*-4 with the inner-radius, first-phase bus pins 118*u*-1 and the outer-radius, first-phase bus pins 118*u*-4, respectively. By way of another example, first-layer, second-phase caps 128*v*-1 and fourth-layer, second-phase caps 128*v*-4 may join the first-layer, second-phase voltage terminals 124*v*-1 and the fourth-layer, second-phase voltage terminals 124*v*-4 with the inner-radius, second-phase bus pins 118*v*-1 and the outer-radius, second-phase bus pins 118*v*-4, respectively. By way of another example, first-layer, third-phase caps 128*w*-1 and fourth-layer, third-phase caps 128*w*-4 may join the first-layer, third-phase voltage terminals 124*w*-1 and the fourth-layer, third-phase voltage terminals 124*w*-4 with the inner-radius, third-phase bus pins 118*w*-1 and the outer-radius, third-phase bus pins 118*w*-4, respectively.

In embodiments, the two of the first-phase bus pins 118u, the two of the second-phase bus pins 118v, and the two of the third-phase bus pins 118w may be disposed along the outer-radius and along the inner-radius. Thus, the electric motor 100 may include a total of twelve of the caps 128. For example, the electric motors 100 may include two of the first-layer, first-phase caps 128u-1, two of the fourth-layer, first-phase caps 128u-4, two of the first-layer, second-phase caps 128v-1, two of the fourth-layer, second-phase caps 128v-4, two of the first-layer, third-phase caps 128w-1, and two of the fourth-layer, third-phase caps 128w-4. Thus, the electric motor 100 may include pairs of the caps 128 which join pairs of voltage terminals 124 and the pairs of bus pins 118. It is further contemplated that the total number of the caps 128 may vary based on the number of the poles-per-group.

The neutral terminals 126 may also be disposed in one or more layers of the winding 114. In embodiments, the neutral terminals 126 may be disposed in the first-layer and/or the fourth-layer of the winding 114, where the winding 114 is a four-layer winding. For example, the first-phase neutral terminals 126u may include first-layer, first-phase neutral terminals 126u-1 disposed in the first-layer and/or fourth-layer, first-phase neutral terminals 126u-4 disposed in the fourth-layer. By way of another example, the second-phase neutral terminals 126v may include first-layer, second-phase neutral terminals 126v-1 disposed in the first-layer and/or fourth-layer, second-phase neutral terminals 126v-4 disposed in the fourth-layer. By way of another example, the third-phase neutral terminals 126w may include first-layer, third-phase neutral terminals 126w-1 disposed in the first-layer and/or fourth-layer, third-phase neutral terminals 126w-4 disposed in the fourth-layer.

The first-phase bus pins 118u, the second-phase bus pins 118v, and the third-phase bus pins 118w may be arranged along the outer-radius and along the inner-radius in a select pattern with the neutral bus 120. For example, the inner-radius may include the neutral bus 120, followed by the inner-radius, third-phase bus pins 118w-1, followed by the neutral bus 120, followed by the inner-radius, first-phase bus pins 118u-1, followed by the neutral bus 120, followed by the inner-radius, first-phase bus pins 118v-1. By way of another example, the outer-radius may include the outer-radius, first-phase bus pins 118u-4, followed by the neutral bus 120, followed by the outer-radius, second-phase bus pins 118v-4, followed by the neutral bus 120, followed by the outer-radius, third-phase bus pins 118w-1, followed by the neutral bus 120.

In embodiments, the bars 116, the bus pins 118, the neutral bus 120, the hairpins 122, and/or the caps 128 may be made from any electrically conductive material. In embodiments, the material may be a rigid metallic element formed from metal. For example, the material be copper, a copper alloy, or the like. The caps 128 may be made of the same material or a different material as the bus pins 118 and the hairpins 122.

Figure 2A:
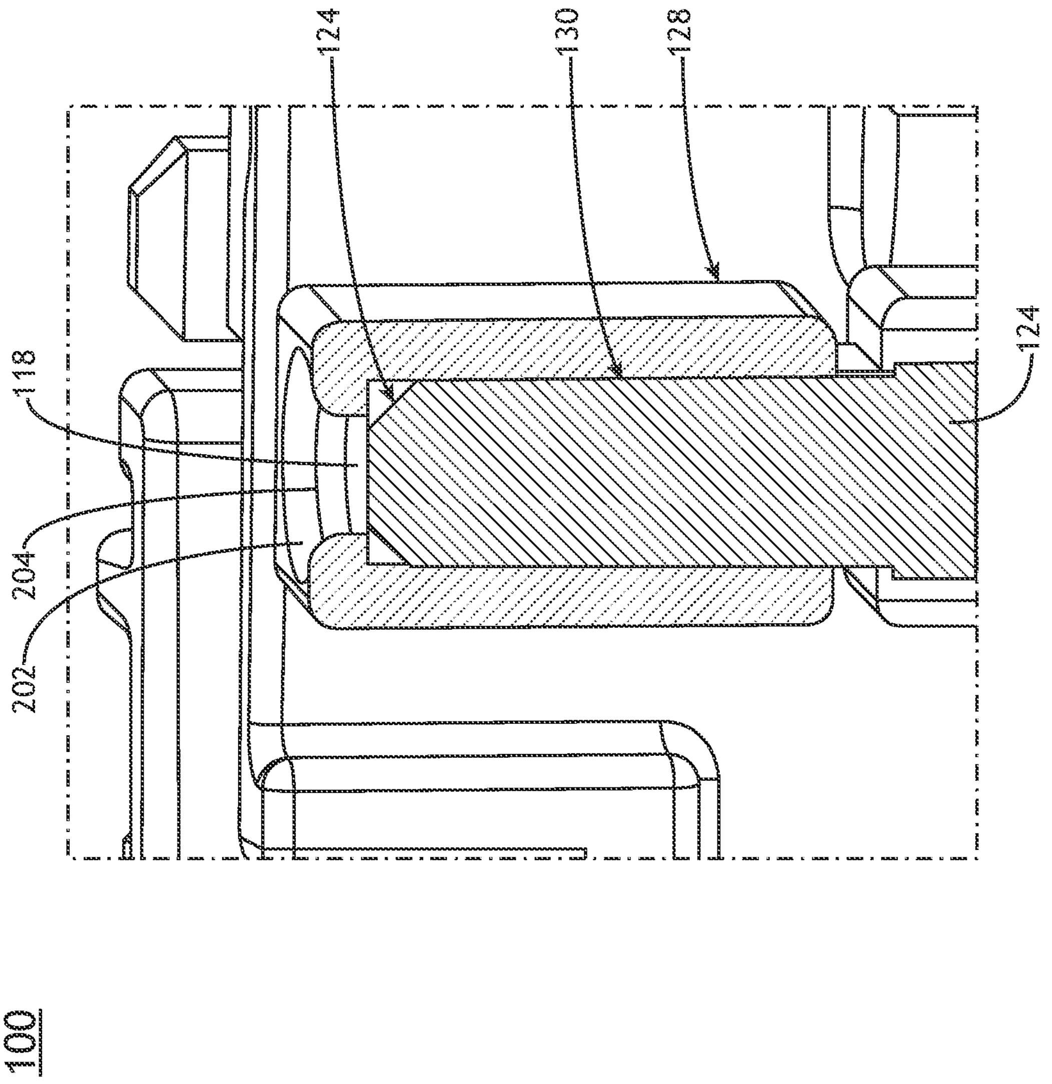
FIG. 2A depicts a cross-section view of a connection between a busbar, a winding, and a cap of an electric motor, in accordance with one or more embodiments of the present disclosure.
Figure 2B:
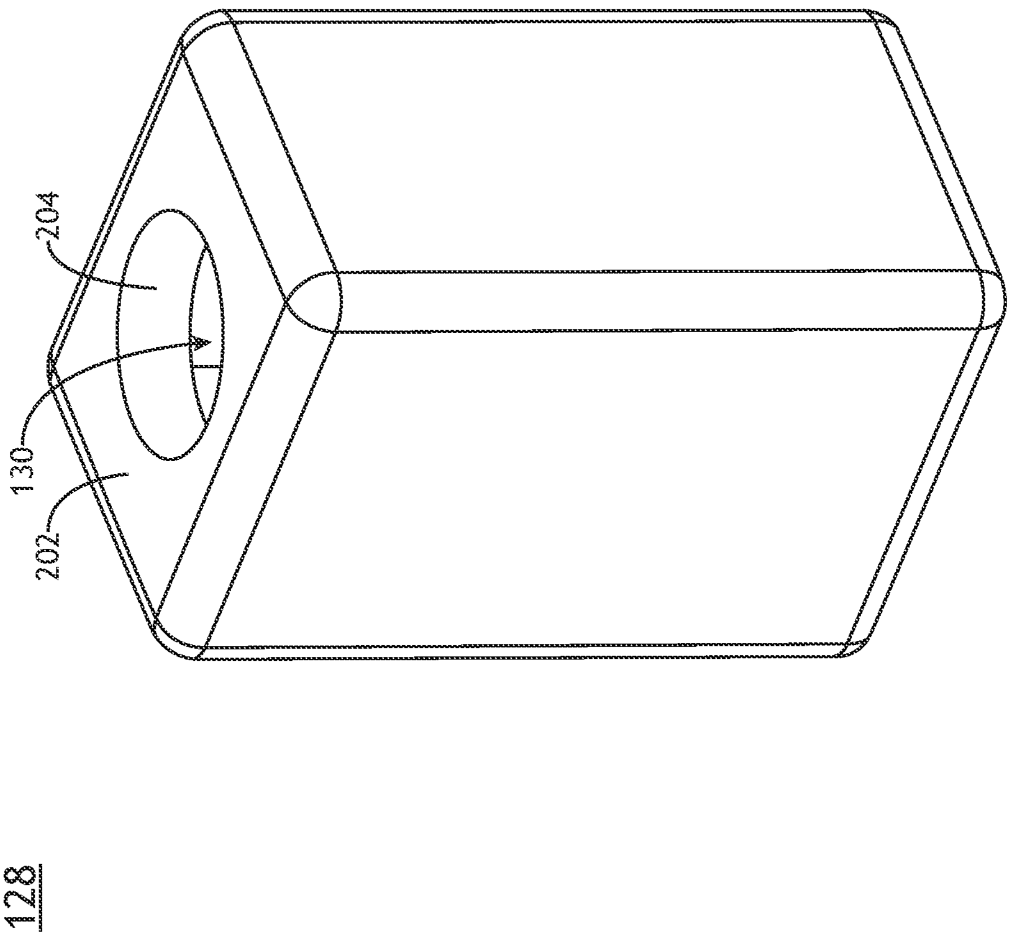
FIG. 2B depicts a perspective view of a cap which has a slot and a rim, in accordance with one or more embodiments of the present disclosure.

FIGS. 2A-2B illustrate the electric motor 100, in accordance with one or more embodiments of the present disclosure. Although the caps 128 are described as being joining the voltage terminals 124 and the bus pins 118 by a press fit and without welding, this is not intended as a limitation of the present disclosure. In embodiments, the caps 128 may join the voltage terminals 124 and the bus pins 118 by a weld.

Although the caps 128 are described as including a hollow cuboid shape, this is not intended as a limitation of the present disclosure. The caps 128 may include the cuboid shape and may define the slots 130. The slots 130 may be defined in a first end of the caps 128. The slots 130 may not be through holes, such that the caps 128 may not include the hollow cuboid shape. The caps 128 may include lips 202. The lips 202 may be disposed at a second end of the caps 128, where the second end opposes the first end. Thus, the lips 202 may be disposed at the end of the slots 130. The voltage terminals 124 and the bus pins 118 may be inserted in the slots 130 up to the lip 202. The voltage terminals 124 and the bus pins 118 may abut the lip 202. The lip 202 may define an opening 204. The opening 204 may include any suitable shaped opening, such as, but not limited to, a circular opening, a triangular opening, square opening, a polygonal opening, or the like. The opening 204 may be defined up to the slots 130. The voltage terminals 124, the bus pins 118, and the lips 202 may be joined by a weld through the opening 204. The lip 202 may provide a region for welding. In embodiments, the lips 202 may act as a filler material when joining the voltage terminals 124, the bus pins 118, and the lips 202 by the weld.

Figure 3A:
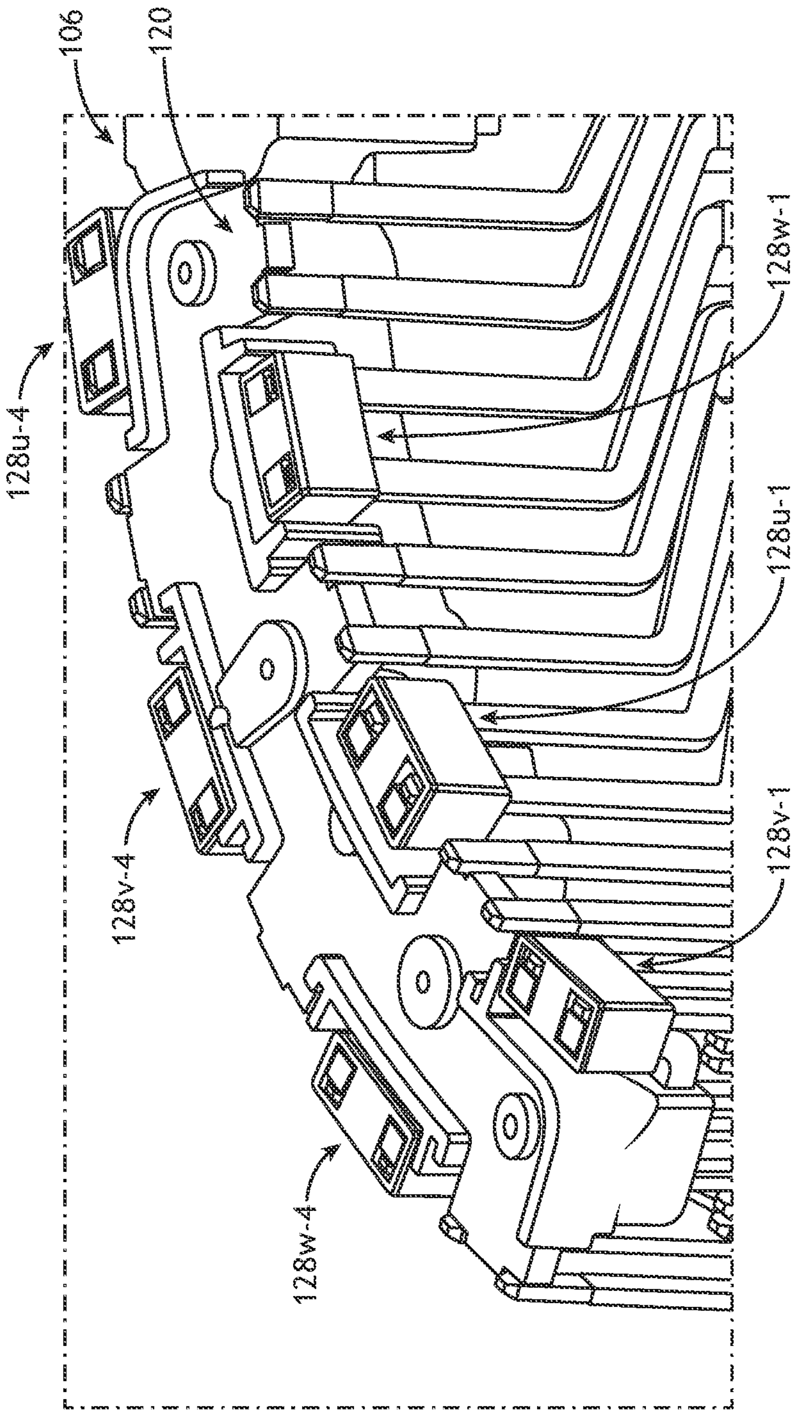
FIG. 3A depicts a perspective view of a connection between a busbar, windings, and caps of an electric motor, in accordance with one or more embodiments of the present disclosure.
Figure 3B:
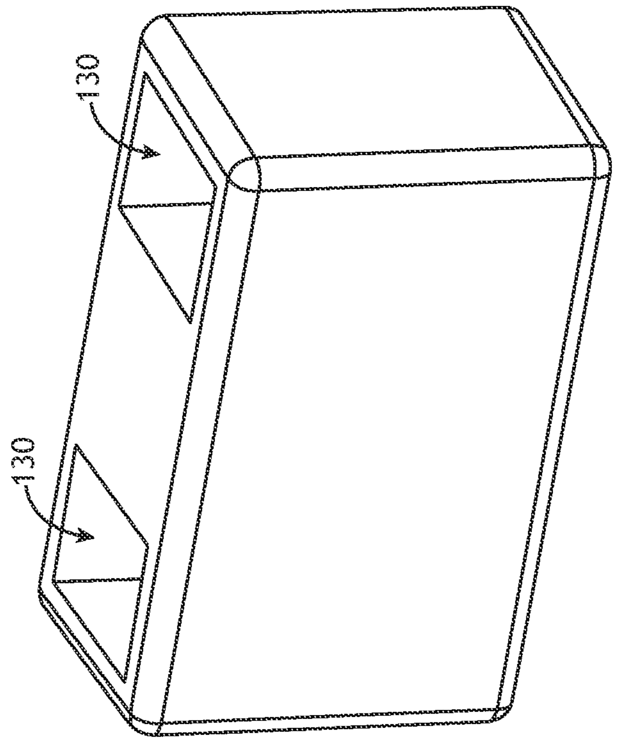
FIG. 3B depicts a perspective view of a cap which has a pair of slots, in accordance with one or more embodiments of the present disclosure.

FIGS. 3A-3B illustrate the electric motor 100, in accordance with one or more embodiments of the present disclosure. Although the electric motor 100 is described as including the caps 128 for each of the connections between the voltage terminals 124 and the bus pins 118, this is not intended as a limitation of the present disclosure. In embodiments, the electric motor 100 may include one of the caps 128 for each of the connections between the voltage terminals 124 and the bus pins 118 at a common phase along the inner-radius and one of the caps 128 for each of the connections between the voltage terminals 124 and the bus pins 118 at a common phase along the outer-radius. Thus, the electric motor 100 may include a total of six of the caps 128 where the winding 114 is a four-layer winding with two hairpins-per-pole-group. For example, a first layer, first-phase cap 128u-1 and a fourth-layer, first-phase cap 128u-4 may join the first-layer, first-phase voltage terminals 124u-1 and the fourth-layer, first-phase voltage terminals 124u-4 with the inner-radius, first-phase bus pins 118u-1 and the outer-radius, first-phase bus pins 118u-4, respectively. By way of another example, a first-layer, second-phase cap 128v-1 and a fourth-layer, second-phase cap 128v-4 may join the first-layer, second-phase voltage terminals 124v-1 and the fourth-layer, second-phase voltage terminals 124v-4 with the inner-radius, second-phase bus pins 118v-1 and the outer-radius, second-phase bus pins 118v-4, respectively. By way of another example, a first-layer, third-phase cap 128w-1 and a fourth-layer, third-phase cap 128w-4 may join the first-layer, third-phase voltage terminals 124w-1 and the fourth-layer, third-phase voltage terminals 124w-4 with the inner-radius, third-phase bus pins 118w-1 and the outer-radius, third-phase bus pins 118w-4, respectively.

The caps 128 may define multiple of the slots 130 to join the voltage terminals 124 and the bus pins 118. The number of the slots 130 to which the caps 128 define may be based on the number of poles-per-group. For example, the caps 128 may each define two of the slots 130 to join two of the voltage terminals 124 and two of the bus pins 118, where the winding 114 includes two hairpins-per-pole-group. Such a configuration of the caps 128 may be a double-slotted cap. The electric motor 100 may not include a matching number of the caps 128 for the hairpins-per-pole-group by defining multiple of the slots 130.

In embodiments, the caps 128 defining multiple of the slots 130 may join the voltage terminals 124 and the bus pins 118 by a press fit.

Figure 4:
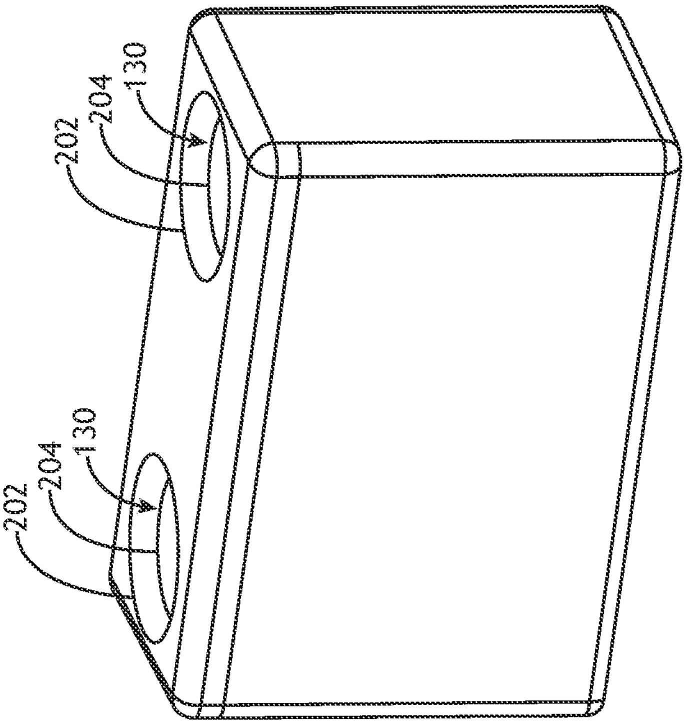
FIG. 4 depicts a perspective view of a cap which has a pair of slots and a pair of rims, in accordance with one or more embodiments of the present disclosure.

FIG. 4 illustrate the cap 128, in accordance with one or more embodiments of the present disclosure. Although the caps 128 defining multiple of the slots 130 are described as joining the voltage terminals 124 and the bus pins 118 by the press fit, this is not intended as a limitation of the present disclosure. In embodiments, the caps 128 defining multiple of the slots 130 may also include the lips 202 disposed at the end of each of the slots 130. Each of the lips 202 may define the openings 204. The voltage terminals 124, the bus pins 118, and the lips 202 may be joined by a weld through the opening 204. Thus, the caps 128 may include permutations of single and/or double slots 130 with a press fit and/or a weld.

Figure 5A:
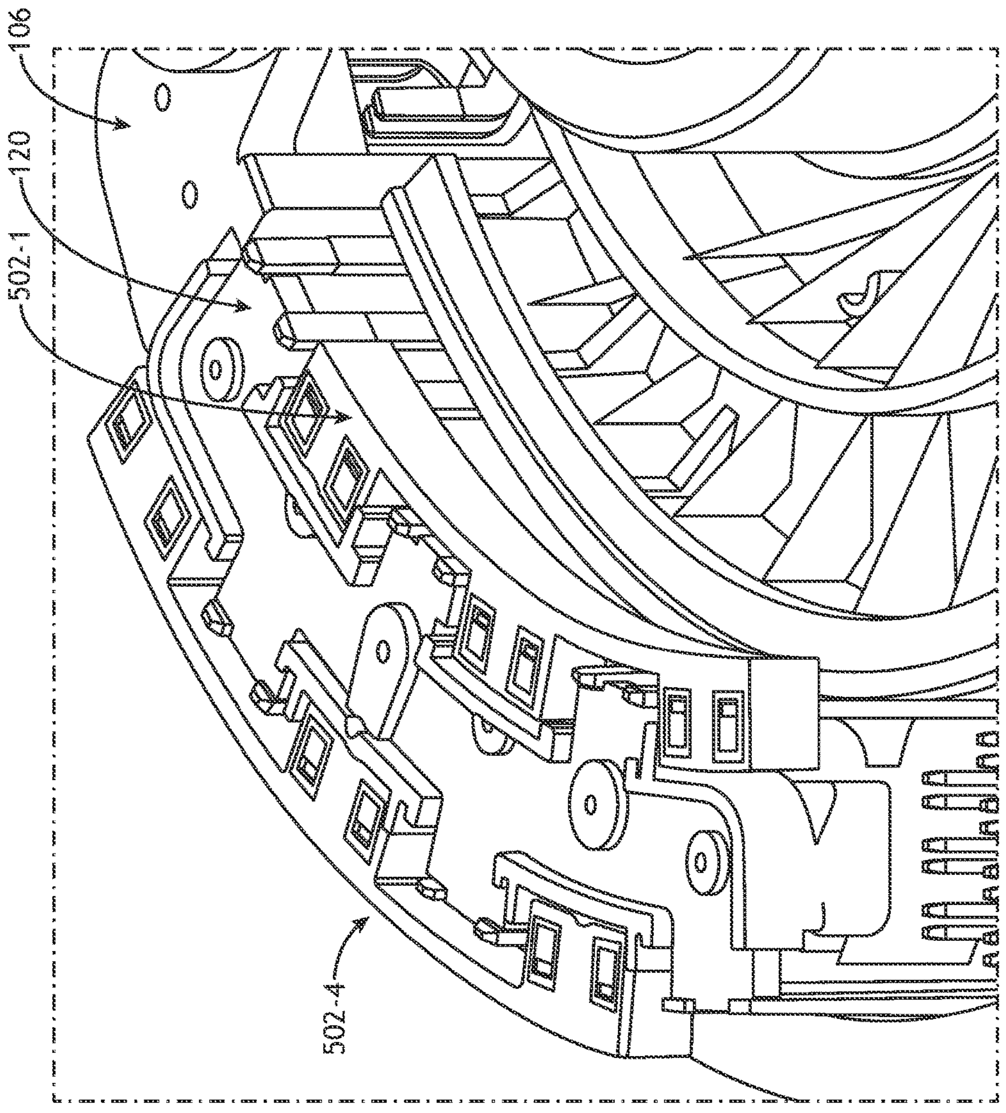
FIG. 5A depicts a perspective view of a connection between a busbar, windings, and clamps of an electric motor, in accordance with one or more embodiments of the present disclosure.
Figure 5B:
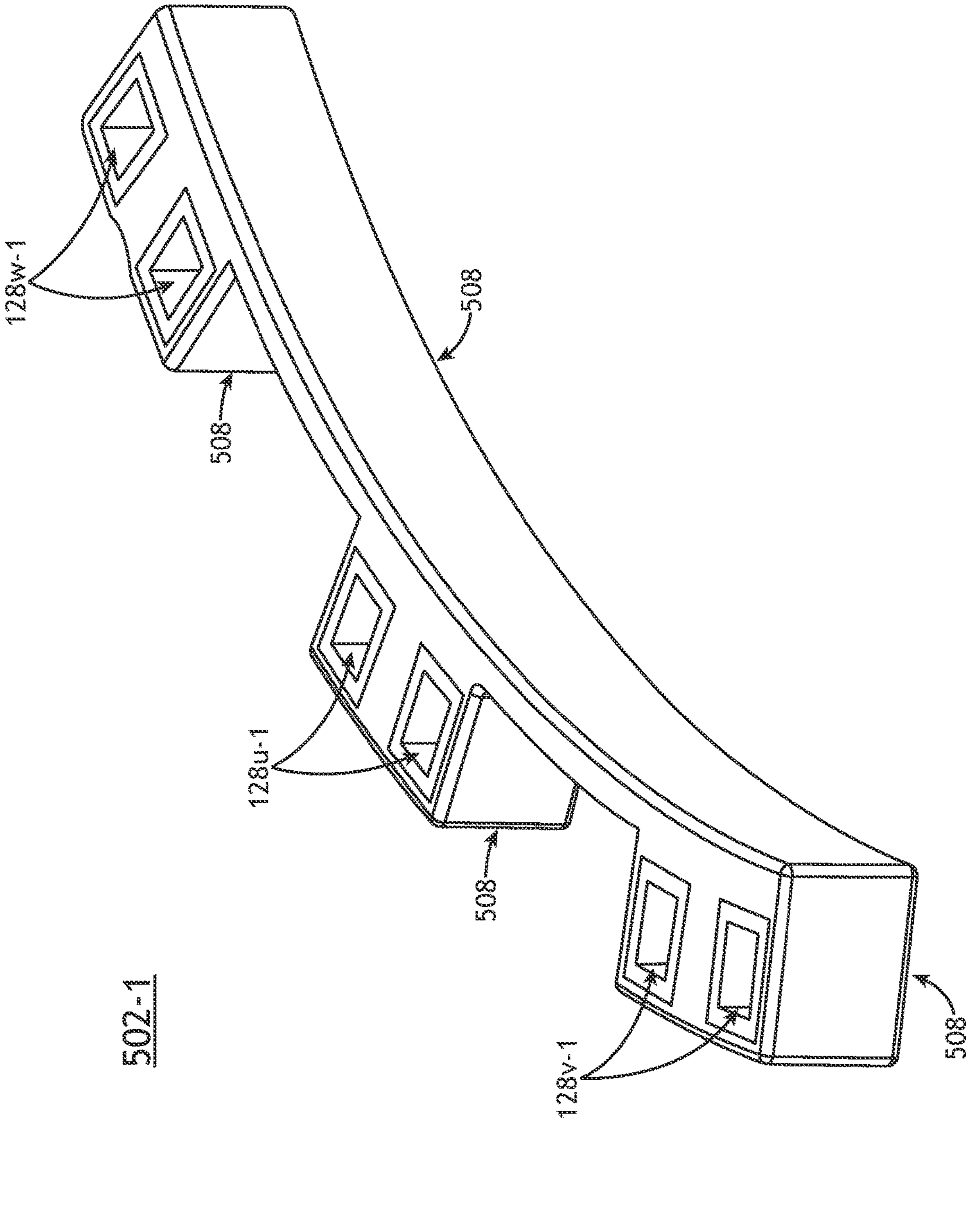
FIG. 5B depicts a perspective view of an inner-radius clamp, in accordance with one or more embodiments of the present disclosure.
Figure 5C:
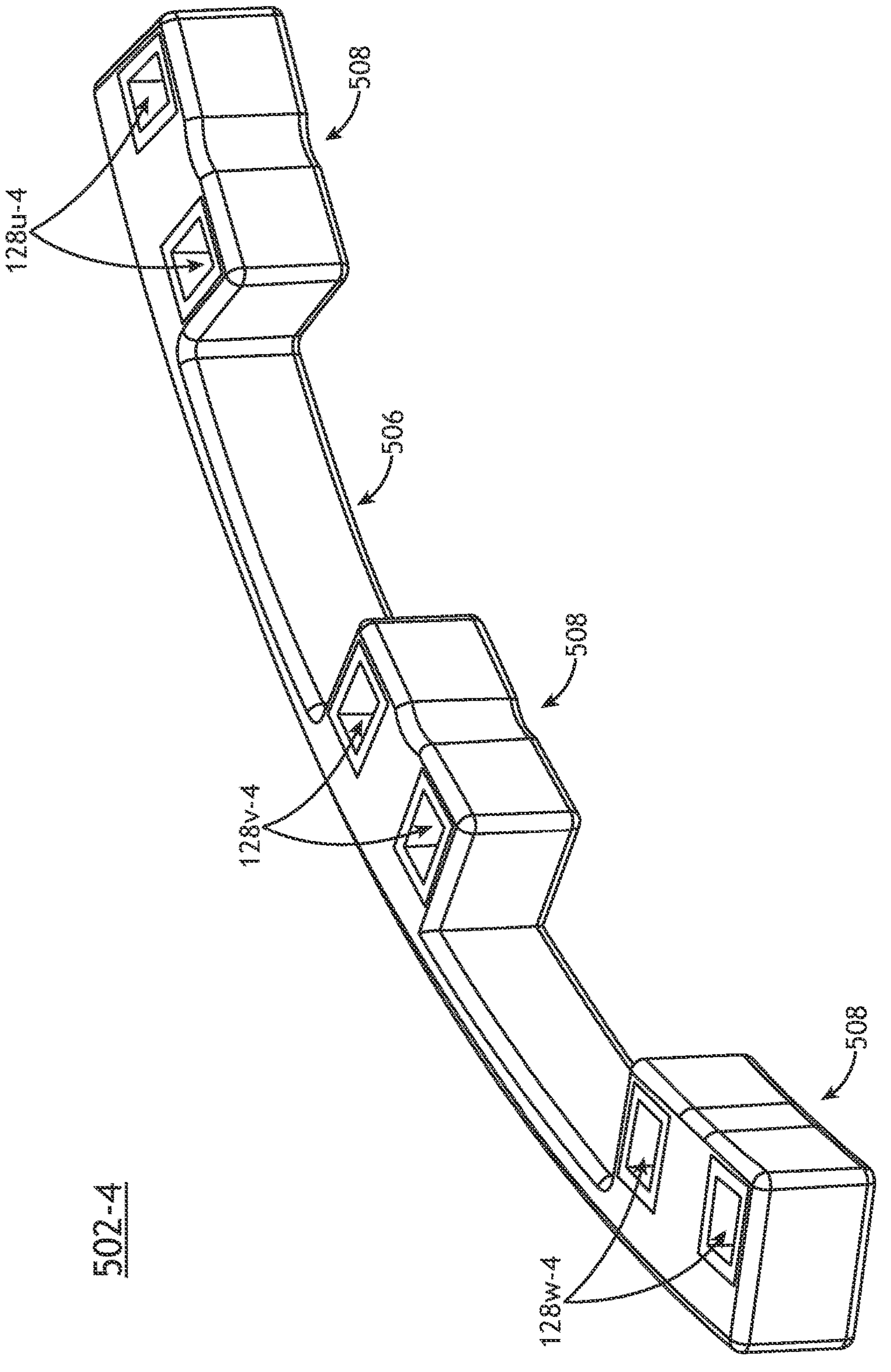
FIG. 5C depicts a perspective view of an outer-radius clamp, in accordance with one or more embodiments of the present disclosure.

FIGS. 5A-5C illustrate the electric motor 100, in accordance with one or more embodiments of the present disclosure. In embodiments, the electric motor 100 may include one or more clamps 502.

The clamps 502 may include the caps 128 and an overmold 504. The clamps 502 may include the caps 128 at each of the phases. The caps 128 may be connected to the overmold 504. The overmold 504 may provide support to the caps 128. The overmold 504 may be from any material which is not electrically conductive. For example, the overmold 504 may be made of a plastic material or the like. In embodiments, the overmold 504 may be plastic injection molded. The overmold 504 may be from any material which is not electrically conductive to insulate the caps 128 from caps which are at other phases.

The clamps 502 may include any of the caps 128, such as, but not limited to, the caps 128 with one or more of the slots 130 (e.g., one, two, or more) which maintain the connection between the voltage terminals 124 and the bus pins 118 by a press fit. It is contemplated that the caps 128 with the weld between the voltage terminals 124, the bus pins 118, and the lip 202 may or may not be suitable for the clamps 502 due to the weld melting the overmold 504.

The overmold 504 may include one or more portions. For example, the overmold 504 may include an arcuate portion 506 and projection portions 508. The projection portions 508 may extend from the arcuate portion 506. The overmold 504 may be shaped to not interfere with the connection between the neutral terminals 126 and the neutral bus 120. The arcuate portion 506 may be disposed adjacent to the connection between the neutral terminals 126 and the neutral bus 120. One or more of the connections between the neutral terminals 126 and the neutral bus 120 may be disposed between the projection portions 508. The clamps 502 may be co-planar with the neutral bus 120 when the caps 128 join the voltage terminals 124 with the bus pins 118.

In embodiments, the electric motor 100 may include an inner-radius clamp 502-1 and an outer-radius clamp 502-4. In embodiments, the inner-radius clamp 502-1 and outer-radius clamp 502-4 may include the caps 128 at each of the phases which are associated with the first-layer and the fourth-layer, respectively. For example, the inner-radius clamp 502-1 may include the first-layer, first-phase caps 128*u*-1, the first-layer, second-phase caps 128*v*-1, and the first-layer, third-phase caps 128*w*-1. By way of another example, the outer-radius clamp 502-4 may include the fourth-layer, first-phase caps 128*u*-4, the fourth-layer, second-phase caps 128*v*-4, and the fourth-layer, third-phase caps 128*w*-4.

In embodiments, the projection portions 508 of the overmold 504 of the inner-radius clamp 502-1 may extend radially outward from the arcuate portion 506 of the inner-radius clamp 502-1. In embodiments, the projection portions 508 of the overmold 504 of the outer-radius clamp 502-4 may extend radially inward from the arcuate portion 506 of the outer-radius clamp 502-4.

The projection portions 508 may be connected to the caps 128. For example, the projection portions 508 of the overmold 504 of the inner-radius clamp 502-1 may be connected to the first-layer, first-phase caps 128*u*-1, the first-layer, second-phase caps 128*v*-1, and the first-layer, third-phase caps 128*w*-1. By way of another example, the projection portions 508 of the overmold 504 of the outer-radius clamp 502-4 may be connected to the fourth-layer, first-phase caps 128*u*-4, the fourth-layer, second-phase caps 128*v*-4, and the fourth-layer, third-phase caps 128*w*-4.

Figure 6:
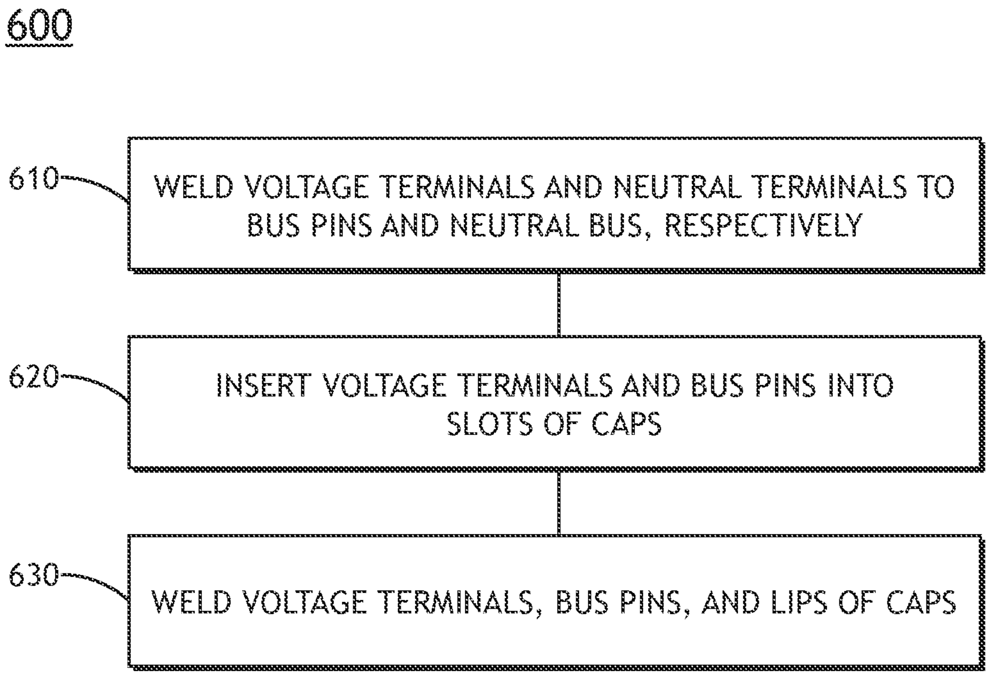
FIG. 6 depicts a flow diagram of a method, in accordance with one or more embodiments of the present disclosure.

FIG. 6 depicts a flow diagram of a method 600, in accordance with one or more embodiments of the present disclosure. The embodiments and the enabling technology described previously herein in the context of the electric motor 100 should be interpreted to extend to the method 600. The method 600 provides a means for electrically coupling the busbar 106 with the winding 114. It is further recognized, however, that the method is not limited to the electric motor 100.

In a step 610, voltage terminals and neutral terminals may be welded to bus pins and a neutral bus, respectively. For example, the voltage terminals 124 may be welded to the bus pins 118 and the neutral terminals 126 may be welded to the neutral bus 120. The voltage terminals 124, bus pins 118, neutral terminals 126, and neutral bus 120 may be welded together to electrically couple the busbar 106 and the winding 114.

In a step 620, the voltage terminals and the bus pins may be inserted into one or more slots of one or more caps. For example, the voltage terminals 124 and the bus pins 118 may be inserted into the slots 130 of the caps 128. The voltage terminals 124 and the bus pins 118 may be inserted into the slots 130 of the caps 128 such that the voltage terminals 124 and the bus pins 118 may be disposed in the slots 130 to join the voltage terminals 124 with the bus pins 118. Joining the voltage terminals 124 and the bus pins 118 by the caps 128 may ensure the electrically coupling between the busbar 106 and the winding 114 is maintained by reducing a failure of the weld between the voltage terminals 124 and the bus pins 118. The voltage terminals 124 and the bus pins 118 may be inserted into the slots 130 with a fit, such as, but not limited to, a press fit, a clearance fit, or the like.

In a step 630, the voltage terminals, the bus pins, and one or more lip of the caps may be welded together. For example, the voltage terminals 124, the bus pins 118, and the lips 202 may be joined by a weld through the opening 204. This step may be considered optional where the voltage terminals 124 and the bus pins 118 may be inserted into the slots 130 with the press fit.

Referring generally again to the figures. The number of the slots in the stator core 112 may be based on the number of hairpins-per-pole-group and the number of poles. For example, the stator core 112 may define seventy-two slots for the winding 114 where the winding 114 is a three-phase winding which defines twelve-poles and two of the hairpins-per-pole-group, although this is not intended to be limiting. Similarly, the number of the hairpins 122 may be based on the number of hairpins-per-pole-group, the number of poles, and the number of layers. For example, the stator core 112 may define seventy-two slots for the winding 114 where the winding 114 is a three-phase winding which defines twelve-poles and two of the hairpins-per-pole-group, although this is not intended to be limiting.

The hairpins 122 may span a select number of slots in the stator core 112. The number of slots in the stator core 112 to which the hairpins 122 span may be based, at least in part, on the number of hairpins-per-pole-group. In particular, the number of slots in the stator core 112 to which the hairpins 122 span may be three times the number of hairpins-per-pole-group. For example, the hairpins 122 may span six of the slots in the stator core 112 where the winding 114 include two of the hairpins-per-pole-group.

The first set of the hairpins 122 and second set of the hairpins 122 may or may not be connected across the layers. For example, the first-phase hairpins 122*u* of the first set of hairpins 122 and the second set of hairpins 122 may be connected across the layers. By way of another example, the second-phase hairpins 122*v* of the first set of hairpins 122 and the second set of hairpins 122 may be connected across the layers. By way of another example, the third-phase hairpins 122*w* of the first set of hairpins 122 and the second set of hairpins 122 may be connected across the layers. In embodiments, the first set of the hairpins 122 and second set of the hairpins 122 may be connected across the layers by a weld, a jumper, or the like.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for applications.

LIST OF REFERENCE NUMBERS

100 electric motor
102 stator
104 rotor
106 busbar
108 junction box
110 stator carrier
112 stator core
114 winding
116 bars
116*u* first-phase bar
116*v* second-phase bar
116*w* third-phase bar
118 bus pins
118*u* first-phase bus pins
118*u*-1 first-layer, first-phase bus pins
118*u*-4 fourth-layer, first-phase bus pins
118*v* second-phase bus pins
118*v*-1 first-layer, second-phase bus pins
118*v*-4 fourth-layer, second-phase bus pins
118*w* third-phase bus pins
118*w*-1 first-layer, third-phase bus pin
118*w*-4 fourth-layer, third-phase bus pins
120 neutral bus
122 hairpins
122*u* first-phase hairpins
122*v* second-phase hairpins
122*w* third-phase hairpins
124 voltage terminals
124*u* first-phase voltage terminals
124*u*-1 first-layer, first-phase voltage terminals
124*u*-4 fourth-layer, first-phase voltage terminals
124*v* second-phase voltage terminals
124*v*-1 first-layer, second-phase voltage terminals
124*v*-4 fourth-layer, second-phase voltage terminals
124*w* third-phase voltage terminals
124*w*-1 first-layer, third-phase voltage terminals
124*w*-4 fourth-layer, third-phase voltage terminals
126 neutral terminals
126*u* first-phase neutral terminals
126*u*-1 first-layer, first-phase neutral terminals
126*u*-4 fourth-layer, first-phase neutral terminals
126*v* second-phase neutral terminals
126*v*-1 first-layer, second-phase neutral terminals
126*v*-4 fourth-layer, second-phase neutral terminals
126*w* third-phase neutral terminals
126*w*-1 first-layer, third-phase neutral terminals
126*w*-4 fourth-layer, third-phase neutral terminals
128 caps
128*u* first-phase caps
128*u*-1 first-layer, first-phase caps
128*u*-4 fourth-layer, first-phase caps
128*v* second-phase caps
128*v*-1 first-layer, second-phase caps
128*v*-4 fourth-layer, second-phase caps
128*w* third-phase caps
128*w*-1 first-layer, third-phase caps
128*w*-4 fourth-layer, third-phase caps
130 slots
202 lips
204 opening
502 clamps
502-1 inner-radius clamp

502-4 outer-radius clamp
504 overmold
506 arcuate portion
508 projection portions

What is claimed:

1. An electric motor comprising:

a rotor;

a stator comprising a stator core and a winding, the winding is a multi-layer winding, the winding comprising a plurality of hairpins, the plurality of hairpins comprising a plurality of voltage terminals and a plurality of neutral terminals, the plurality of voltage terminals comprising first-layer voltage terminals and last-layer voltage terminals, the plurality of neutral terminals comprising first-layer neutral terminals and last-layer neutral terminals;

a busbar comprising a plurality of bus pins and a neutral bus, the plurality of neutral terminals are connected to the neutral bus, the plurality of bus pins comprising inner-radius bus pins disposed along an inner-radius of the busbar and outer-radius bus pins disposed along an outer-radius of the busbar, the neutral bus connecting the first-layer neutral terminals and the last-layer neutral terminals; and a plurality of caps, the plurality of caps comprise a cuboid shape, at least some of the plurality of caps define one or more slots, the plurality of voltage terminals and the plurality of bus pins are disposed in the one or more slots to join the plurality of voltage terminals with the plurality of bus pins, the plurality of caps comprising first-layer caps and last-layer caps, the first-layer caps join the first-layer voltage terminals and the inner-radius bus pins, the last-layer caps join the last-layer voltage terminals and the outer-radius bus pins.

2. The electric motor of claim 1, wherein the plurality of caps comprise a hollow cuboid shape; wherein the plurality of voltage terminals are press fit into the one or more slots with the plurality of bus pins.

3. The electric motor of claim 1, wherein the plurality of caps comprise one or more lips; wherein the one or more lips are disposed at an end of the one or more slots; wherein the one or more lips define an opening up to the one or more slots; wherein the plurality of voltage terminals, the plurality of bus pins, and the one or more lips are joined by one or more welds through the opening.

4. The electric motor of claim 1, wherein the one or more slots are rectangular slots.

5. The electric motor of claim 1, wherein the plurality of caps comprise a copper or a copper alloy.

6. The electric motor of claim 1, wherein the electric motor is a three-phase electric motor.

7. The electric motor of claim 6, wherein the plurality of hairpins comprise one or more first-phase hairpins, one or more second-phase hairpins, and one or more third-phase hairpins;

wherein the one or more first-phase hairpins comprise one or more first-phase voltage terminals and one or more first-phase neutral terminals; wherein the one or more second-phase hairpins comprise one or more second-phase voltage terminals and one or more second-phase neutral terminals; wherein the one or more third-phase hairpins comprise one or more third-phase voltage terminals and one or more third-phase neutral terminals;

wherein the one or more first-phase neutral terminals, the one or more second-phase neutral terminals, and the one or more third-phase neutral terminals are connected to the neutral bus.

8. The electric motor of claim 7, wherein the plurality of bus pins comprise one or more first-phase bus pins, one or more second-phase bus pins, and one or more third-phase bus pins.

9. The electric motor of claim 8, wherein the plurality of caps comprise:

one or more first-phase caps joining the one or more first-phase voltage terminals with the one or more first-phase bus pins;

one or more second-phase caps joining the one or more second-phase voltage terminals with the one or more second-phase bus pins; and one or more third-phase caps joining the one or more third-phase voltage terminals with the one or more third-phase bus pins.

10. The electric motor of claim 9, wherein the winding comprises two hairpins-per-pole-group.

11. The electric motor of claim 10, wherein the electric motor comprises a matching number of the plurality of caps for the two hairpins-per-pole-group.

12. The electric motor of claim 10, wherein the plurality of caps define two of the one or more slots.

13. The electric motor of claim 9, wherein the winding is a four-layer winding such that the last-layer voltage terminals comprise fourth-layer voltage terminals, the last-layer neutral terminals comprise fourth-layer neutral terminals, and the last-layer caps comprise fourth-layer caps.

14. The electric motor of claim 13, wherein the first-layer voltage terminals and the fourth-layer voltage terminals of the one or more first-phase voltage terminals comprise one or more first-layer, first-phase voltage terminals and one or more fourth-layer, first-phase voltage terminals, respectively;

wherein the first-layer voltage terminals and the fourth-layer voltage terminals of the one or more second-phase voltage terminals comprise one or more first-layer, second-phase voltage terminals and one or more fourth-layer, second-phase voltage terminals;

wherein the first-layer voltage terminals and the fourth-layer voltage terminals of the one or more third-phase voltage terminals comprise one or more first-layer, third-phase voltage terminals and one or more fourth-layer, third-phase voltage terminals.

15. The electric motor of claim 14, wherein the inner-radius bus pins and the outer-radius bus pins of the one or more first-phase bus pins comprise one or more inner-radius, first-phase bus pins disposed along the inner-radius of the busbar and one or more outer-radius, first-phase bus pins disposed along the outer-radius of the busbar, respectively;

wherein the inner-radius bus pins and the outer-radius bus pins of the one or more second-phase bus pins comprise one or more inner-radius, second-phase bus pins disposed along the inner-radius and one or more outer-radius, second-phase bus pins disposed along the outer-radius, respectively;

wherein the inner-radius bus pins and the outer-radius bus pins of the one or more third-phase bus pins comprise one or more inner-radius, third-phase bus pins disposed along the inner-radius and one or more outer-radius, third-phase bus pins disposed along the outer-radius, respectively.

16. The electric motor of claim 15, wherein the first-layer caps and the last-layer caps of the one or more first-phase caps comprise one or more first-layer, first-phase caps and one or more fourth-layer, first-phase caps, respectively; wherein the one or more first-layer, first-phase caps join the one or more first-layer, first-phase voltage terminals with the one or more inner-radius, first-phase bus pins; wherein the one or more fourth-layer, first-phase caps join the one or more fourth-layer, first-phase voltage terminals with the one or more outer-radius, first-phase bus pins;

wherein the first-layer caps and the last-layer caps of the one or more second-phase caps comprise one or more first-layer, second-phase caps and one or more fourth-layer, second-phase caps, respectively; wherein the one or more first-layer, second-phase caps join the one or more first-layer, second-phase voltage terminals with the one or more inner-radius, second-phase bus pins; wherein the one or more fourth-layer, second-phase caps join the one or more fourth-layer, second-phase voltage terminals with the one or more outer-radius, second-phase bus pins;

wherein the first-layer caps and the last-layer caps of the one or more third-phase caps comprise one or more first-layer, third-phase caps and one or more fourth-layer, third-phase caps, respectively; wherein the one or more first-layer, third-phase caps join the one or more first-layer, third-phase voltage terminals with the one or more inner-radius, third-phase bus pins; wherein the one or more fourth-layer, third-phase caps join the one or more fourth-layer, third-phase voltage terminals with the one or more outer-radius, third-phase bus pins.

17. The electric motor of claim 16, comprising an inner-radius clamp and an outer-radius clamp; wherein the inner-radius clamp and the outer-radius clamp comprise an overmold; wherein the inner-radius clamp comprises the one or more first-layer, first-phase caps, the one or more first-layer, second-phase caps, and the one or more first-layer, third-phase caps; wherein the outer-radius clamp comprises the one or more fourth-layer, first-phase caps, the one or more fourth-layer, second-phase caps, and the one or more fourth-layer, third-phase caps.

18. The electric motor of claim 17, wherein the overmold of the inner-radius clamp comprises a first arcuate portion and a first plurality of projection portions; wherein the first plurality of projection portions extend radially outward from the first arcuate portion; wherein the first plurality of projection portions are connected to the one or more first-layer, first-phase caps, the one or more first-layer, second-phase caps, and the one or more first-layer, third-phase caps;

wherein the overmold of the outer-radius clamp comprises a second arcuate portion and a second plurality of projection portions; wherein the first arcuate portion and the second arcuate portion are ring segments; wherein the second plurality of projection portions extend radially inward from the second arcuate portion; wherein the second plurality of projection portions are connected to the one or more fourth-layer, first-phase caps, the one or more fourth-layer, second-phase caps, and the one or more fourth-layer, third-phase caps.

* * * * *